Figures 1, 2:
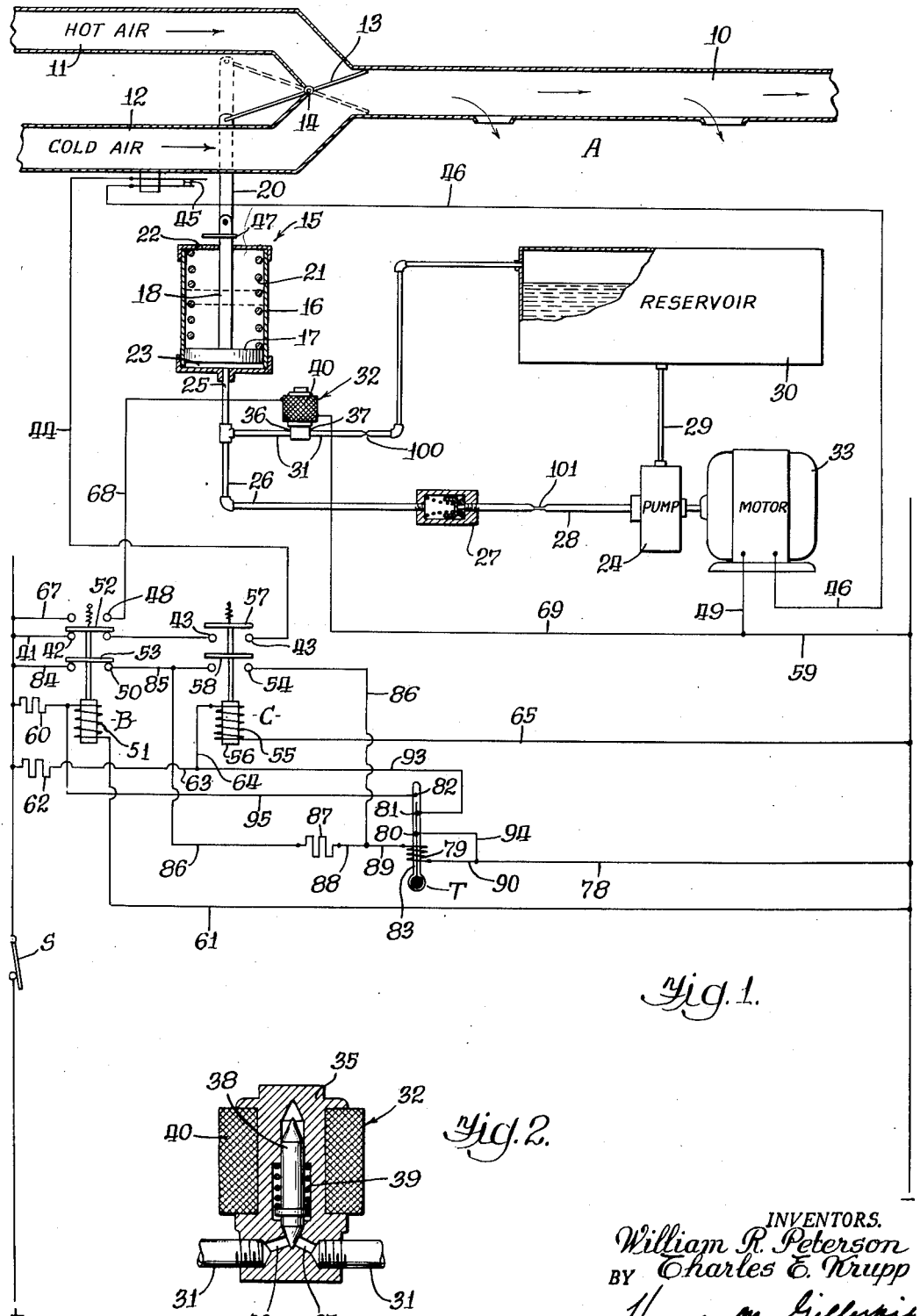

Jan. 3, 1956     W. R. PETERSON ET AL     2,729,394
HYDRAULIC DAMPER CONTROL
Filed Dec. 12, 1952

INVENTORS.
William R. Peterson
BY Charles E. Krupp

Harvey M. Gillespie
Atty

United States Patent Office 2,729,394
Patented Jan. 3, 1956

2,729,394

HYDRAULIC DAMPER CONTROL

William R. Peterson, Oaklawn, and Charles E. Krupp, Evanston, Ill., assignors to Vapor Heating Corporation, Chicago, Ill., a corporation of Delaware Application December 12, 1952, Serial No. 325,732

5 Claims. (Cl. 236—13)

The present invention relates to temperature control apparatus and more particularly to an electrically controlled hydraulic mechanism which is readily applicable to heating and ventilating systems for regulating the temperature of an enclosure as for example a railway car enclosure or other habitable space.

A general object of the invention is to provide a novel control apparatus of this character which is of simplified construction yet which is highly reliable and which will operate to automatically regulate the position of a damper or other form of valve element by modulated movements thereof in opposite directions in response to temperature changes within an enclosed space so as to maintain a substantially uniform temperature within the space.

Another object of the invention is to provide an electro-hydraulic apparatus for the purpose outlined above in which the hydraulic mechanism employed is of an extremely simplified nature, consisting as it does of but three hydraulic units in addition to the usual fluid supply reservoir and the electrically driven pump.

The invention, briefly described, includes the provision of an apparatus in which movements of a damper are effected by corresponding movements of a spring-loaded hydraulic piston operating in a cylinder to which fluid is pumped from a fluid supply under the control of an electric motor. The position of the damper at any given instant is determined by the amount of fluid introduced into the cylinder, i. e. by the volumetric content thereof. A check valve in the fluid line leading from the pump to the cylinder and a normally closed solenoid actuated valve disposed in a by-pass conduit connecting the fluid line to the fluid supply are the sole remaining hydraulic devices employed in the system. The solenoid controlled valve is adapted to become open upon energization thereof.

The hydraulic mechanism outline above is operable under the control of a thermostat which operates by means of a relay mechanism to energize the pump motor. The thermostat is provided with spaced apart contacts which define the upper and lower limits of a predetermined temperature range. When the temperature within the enclosure is below the lower limit of said temperature range, the thermostat is opened at its lower contact. This results in energizing the pump motor to introduce fluid into the hydraulic cylinder to move the damper in a direction so as to increase the delivery of heat. When the desired temperature is obtained within the enclosure the thermostat will be closed at its lower contact. During this condition the thermostat functions to de-energize the pump motor and the check valve and normally closed solenoid valve will operate to maintain the system stable so that the volumetric content of the cylinder is neither increased nor diminished as long as the temperature of the enclosure remains within the predetermined temperature range. However, if the temperature of the enclosure rises until the thermostat is closed at its upper contact the solenoid valve is energized and the by-pass conduit is opened to allow the cylinder to discharge a portion or all of its contents gradually to the fluid reservoir. Such discharge of fluid occasions movement of the spring-loaded piston to move the damper in a direction to reduce the volume of heat delivered into the enclosure.

The invention further contemplates the periodic application of auxiliary heat to the control thermostat under the control of the relay mechanism in such a manner that when the static condition of the system briefly outlined above is not prevalent, the movements of the damper in either direction are modulated within very fine limits so as to avoid undue and extreme displacements thereof.

The invention consists of the novel constructions, combinations and arrangements of parts shown in the accompanying drawing representing a preferred embodiment of the invention.

In these drawings:

Fig. 1 is a general view, somewhat schematic in its representation, showing the improved control system comprising the present invention; and Fig. 2 is a sectional view taken substantially centrally and longitudinally through a solenoid controlled valve employed in connection with the invention.

Referring now to the drawings in detail, the improved control apparatus of the present invention is shown as being applied to a heating and ventilating system wherein tempered air is delivered into an enclosure A from an air distributing duct 10. This duct communicates with branch conduits 11 and 12, the former serving to deliver heated air to the duct 10 and the latter serving to deliver unheated air thereto. The proportions of heated and unheated air entering the duct 10 may be varied by means of a proportioning valve or damper 13 which is pivoted as at 14. The damper may move between two extreme positions, one shown in full lines wherein the conduit 11 is closed, and the other shown in dotted lines wherein the conduit 12 is closed. In any intermediate position, the proportion of heated and unheated air delivered to the duct 10 is a function of the position which the damper assumes.

It will be understood that the above described arrangement is illustrative of only one form of heating and ventilating system to which the present control apparatus may be applied and other heating and/or ventilating systems, as for example one wherein a controllable damper or valve element is used for regulating the quantity or character of a heating fluid delivered to a heat exchange device within the enclosure, are subject to control by the apparatus of the present invention.

The present control apparatus involves in its general organization a hydraulic motor 15 in the form of a cylinder 16 having a piston 17 slidable therein and provided with a stem 18 which is connected by means of a link 20 to the damper 13. The piston 13 is spring loaded by means of a compression spring 21 so that movement of the piston against the force of the spring will serve to move the damper 13 toward its dotted line position to close off the conduit 12. The space within the cylinder 16 on one side of the piston 17 is bled to atmosphere through a port 22 and the space 23 on the other side of the piston is connected to the outlet side of a pump 24 through conduit sections 25, 26, a check valve 27 and conduit section 28. The pump 24 has its inlet side operatively connected through a conduit section 29 to a source of operating fluid contained within a reservoir 30. A by-pass conduit 31 having a normally closed solenoid-actuated valve 32 interposed therein establishes communication between the space 23 within the cylinder 16 and the reservoir 30 in a manner and for a purpose that will become clear presently. The pump 24 is operatively connected to and is adapted to be driven by an electric motor 33.

The cylinder 16, valves 32 and 27, pump 24 and reservoir 30 constitute the only hydraulic devices associated with the present control system and, with these devices related to one another as just described, it will be seen that during energization of the motor 33, fluid will be drawn from the reservoir 30 by the pump 24 and delivered through conduit section 28, check valve 27, and conduit sections 26, 25 to the space 23 within the cylinder 16 so as to cause the piston 17 to move upwardly therein as viewed in Fig. 1 and transmit its motion to the damper 13 to move the latter in a direction tending to increase the flow of heated air from the conduit 11 and to decrease the flow of unheated air from the conduit 12. The space 23 thus constitutes a variable volume expansion chamber whose changing increments of volume are reflected in changing increments of motion of the damper 13.

The solenoid actuated valve 32 is shown in detail in Fig. 2 and includes a non-magnetic valve casing 35 provided with inter-communicating inlet and outlet passages 36 and 37 respectively which are normally maintained out of communication with each other by means of a valve element 38 which is slidable in the casing 35 and spring pressed as at 39 to maintain the valve closed. A solenoid winding 40 encircles the valve casing 35 and is adapted upon energization thereof to move the valve element 38 against the force of the spring 39 to establish communication between the passages 36 and 37 and thus open the valve. The winding 40 remains normally de-energized in the electrical circuit provided for it and thus the valve 32 remains normally closed so as to prevent fluid flow in the by-pass conduit 31 and allow the full force of fluid issuing from the pump to be applied to the expansion chamber 23 in the cylinder 16 as previously described.

The electric circuit for the motor 33 extends from the positive side of a suitable source of current through lead 41, normally open contacts 42 of a relay B, normally open contacts 43 of a relay C, lead 44, a pair of normally closed limit contacts 45, lead 46, motor 33, and leads 49, 59, to the negative side of the line. The limit contacts 45 are positioned in the path of movement of a finger 47 carried by the piston rod 18 and are so designed that when the piston 17 approaches the limit of its movement in an upward direction as seen in Fig. 1, the finger will engage and cause separation of the contacts to open the motor circuit.

In addition to the normally open contacts 42, the relay switch B includes a pair of normally closed contacts 48 and a pair of normally open contacts 50, the three sets of contacts being operable under the control of a relay magnet coil 51 having a core operable upon energization of the magnet coil to shift its position and consequently the positions of a pair of contact bridging members 52 and 53 to open the contacts 48 and close the contacts 42 and 50.

In addition to the normally open contacts 43, the relay C includes a pair of normally open contacts 54, the two pairs of contacts being operable under the control of a relay magnet coil 55 having a movable core 56 and associated bridge members 57 and 58, operable upon energization of the coil 55 to close both pairs of contacts 43 and 54.

The coil 51 of the relay-operated switch B is disposed in a normally energized circuit extending from the positive side of the line through current limiting resistor 60, coil 51 and lead 61 to the negative side of the line. The coil 55 of the switch C is disposed in a similar circuit extending from the positive side of the line, through current limiting resistor 62, leads 63 and 64, coil 55 and lead 65 to the negative side of the line.

The winding 40 of the solenoid valve 32 is disposed in a circuit extending from the positive side of the line, through lead 67, normally closed contacts 48, lead 68, winding 40 and leads 69 and 59 to the negative side of the line.

The two relay switches B and C operate under the control of a thermostat T which is preferably of the mercury column type having three contacts 80, 81 and 82 associated therewith and adapted to become progressively bridged as the thermostat column 83 rises in height to perform certain electrical functions, the nature of which will be made clear presently.

The thermostat T is provided with an auxiliary heater 79 disposed in a circuit extending from the positive side of the line through lead 84, contacts 50 of the relay B, leads 85, 86, resistor 87, leads 88, 89, heater 79 and leads 90 and 78 to the negative side of the line. The heater 79 is also disposed in a parallel circuit extending from lead 85 through contacts 54 of the switch C and from lead 86 to the lead 89. The thermostat contacts 80, 81 and 82 are operatively connected in circuitry that will be traced when the operation of the control apparatus as a whole is described.

The thermostat T is constructed to operate at predetermined ambient temperatures and the ohmic value of the resistor 87 may be chosen so that the auxiliary heater 79 will supply 2° of heat to the column 83 to produce a cycling action of the thermostat, the nature of which will become clear when the operation of the apparatus is explained. By way of example, the thermostat may be so constructed that the column 83 engages the contact 81 at a temperature of 70° F. and engages the contact 82 at 75° F. The contact 80 may be engaged by the column 83 at a much lower temperature, as for example in the neighborhood of 50° F. or even lower.

In the operation of the apparatus, if it is assumed that the temperature of the enclosure A is below 70° F. (which is the temperature rating of the contact 81), closure of the master switch S will cause immediate energization of the two relay magnet coils 51 and 55 through the previously described circuits therefor. Energization of these two magnet coils will open the contacts 48 and close the contacts 50, 43 and 54. Opening of the contacts 48 will serve to open the circuit of the solenoid valve winding 40 thus closing the valve 32 and consequently the by-pass conduit 31. Closure of the contacts 42 and 43 (which are in series in the motor circuit previously described) will cause energization of the motor 33 and operation of the pump 24.

Immediately upon operation of the pump 24, fluid will be withdrawn from the reservoir 30 and conducted through the check valve 27 to the expansion chamber 23 to move the piston upwardly in the cylinder so as to swing the damper 13 toward its dotted line position and admit heated air to the duct 10 from the branch conduit 11 and decrease the supply of unheated air issuing from the branch conduit 12. Such movement of the damper will cause a gradual rise in the temperature of the enclosure A.

Initial energization of the two relay magnet coils 51 and 55 and consequent closure of the contacts 50 and 54 will establish the two previously described parallel circuits through the auxiliary heater 79, thus augmenting the normal rise of the mercury column 83 until such time as the column engages the lower contact 81. At this time a shunt circuit will be established around the magnet coil 55 of the switch C. This shunt circuit extends from the positive line through resistor 62, lead 63, lead 93, contacts 81 and 80, leads 94 and 78 to the negative line. As soon as this shunt circuit is established, the relay coil 55 becomes de-energized and current flow through the coil 55 drops to such an extent that the contacts 43 and 54 become open. Opening of the contacts 43 serves to open the motor circuit to de-energize the motor and stop the operation of the pump 24.

The closing of contacts 54 applies approximately 40° of heat to the thermostat heater 79 and therefore imposes a heating cycle on the thermostat T and relay C when the mercury column of thermostat T stands below the contact 80 while the relay B is energized closed.

When the condition just described obtains with the height of the column 83 being such that the column passes the contact 80 but remains below the contact 82, a generally static condition of the entire apparatus obtains. The duration of this static condition depends upon the relative rate of heat dissipation from the enclosure A in relation to the amount of heat being continuously introduced into the enclosure A. If these factors substantially balance each other, the column 83 will seek a level between the contacts 81 and 82 and the motor will remain de-energized indefinitely. The fluid previously introduced into the expansion chamber 23 is prevented from returning to the pump 24 by virtue of the check valve 27. The solenoid valve 40 being closed, this fluid cannot enter the reservoir 30. The fluid is thus trapped within the chamber 23 and conduit 26 and the piston 17 remains stationary and the position of the damper 13 thus remains fixed. At this time the only consumption of current by the electrical apparatus is the relatively small amount of current flowing through the coil 51 of the switch B and through the heater 79.

The static condition of the system will be terminated only upon an interruption in the balance between the heat dissipated from the enclosure and the heat introduced thereinto. If the temperature of the enclosure falls, the shunt circuit previously described will be broken when the column 83 falls below the level of the contacts 81. The coil 55 of the switch C will then be again energized to close the motor circuit and operate the pump 24. If the temperature of the enclosure rises to a point where the column 83 engages the contact 82, a new set of conditions will obtain wherein a shunt circuit for the magnet coil 51 will become effective to de-energize the coil to such an extent that the switch will assume its normal position wherein the contacts 42 and 50 become open and the contacts 48 become closed. This shunt circuit extends from the positive line through resistor 60, lead 95, thermostat contacts 82, 80 and leads 94 and 78 to the negative line.

Opening of the contacts 50 serves to de-energize the circuit through the thermostat heater 79 while opening of the contacts 50 is without effect inasmuch as the contact 54 opened when the static condition of the apparatus first became effective. Closure of the contacts 48 however serves to energize the previously described circuit through the solenoid winding 40 and such energization thereof causes opening of the valve 32 so as to connect the expansion chamber 23 of the cylinder 16 to the reservoir 30 through the by-pass conduit 31. The fluid contained in the expansion chamber is thus expelled under the influence of the spring-loaded piston 17 and is returned to the reservoir while at the same time the damper 13 is moved in a direction tending to decrease the supply of heated air to the duct 10 and to increase the supply of unheated air thereto.

It is to be noted that the auxiliary heater 79 makes possible a cycling operation of the thermostat T and the current limiting resistor 87 which regulates the current flowing through the heater 79 may aptly be termed the cycling resistor. If the static condition of the apparatus previously referred to is of short duration due to an excess of heat introduced into the enclosure in the form of heated air over the heat dissipated from the enclosure, the ambient heat, augmented by the auxiliary heat supplied by the heater 79 will bring the height of the mercury column 83 to the level of the contact 82. This causes de-energization of the heater 79 and the heater will dissipate its heat at a rate commensurate with the actual ambient temperature of the enclosure. If this temperature is relatively low the heater will dissipate its heat more rapidly than if the temperature be relatively high. In the former instance it will require a longer period of time for the heater to bring the column 83 to the height of the contacts 82 after re-energization of the heater than it will require in the latter instance.

When the temperature of the enclosure A stands substantially at the functional setting of the thermostat T, the cycling action of the thermostat in response to minor temperature changes may be relatively fast. In order to avoid altering the position of the damper 13 in response to such fast cycling operations of the thermostat, the flow of fluid in the by-pass conduit 31 is retarded by means of a restriction 100 and a similar restriction 101 is disposed in the conduit section 28. In this manner only small increments of fluid flow into and out of the expansion chamber 23 will take place during that portion of the cycle when the apparatus calls for a change in the position of the damper 13. Thus wide fluctuations of the damper will be prevented.

The invention is not to be limited to the exact arrangement of parts shown in the accompanying drawing or described in this specification, as various changes in the details of construction may be resorted to without departure from the spirit of the invention. For example, although the variable volume expansion chamber has been shown as existing by virtue of a piston slidable in an hydraulic cylinder it is contemplated that such an expansion chamber may be created by utilizing a diaphragm, Sylphon bellows or the like, with the movable member thereof operatively connected to the damper 13. Only insofar as the invention has particularly been pointed out in the accompanying claims is the same to be limited.

We claim:

1. In combination with means including an adjustable damper for proportionately blending heated and unheated air for delivery into an enclosure to vary the temperature thereof, of means for adjusting the damper in opposite directions comprising an hydraulic reciprocating motor operatively connected to said damper and means for operating the same including a spring for operating said motor and damper in one direction, fluid pressure means for moving said motor and damper in the opposite direction including a fluid pressure source separate from said motor, an electric motor operated pump for withdrawing fluid from said source and forcing it into said hydraulic motor, a by-pass conduit connecting said fluid source with said hydraulic motor, a normally closed but energized open solenoid valve disposed in said by-pass conduit and operable when energized to pass hydraulic fluid from said hydraulic motor to said source, an electric circuit for said solenoid valve, an electric circuit for said pump motor, means for controlling the energization of said solenoid valve and said pump motor comprising two pairs of normally opened fixed contacts arranged in series in said motor circuit, a pair of normally closed fixed contacts in the solenoid circuit, a first relay magnet operable upon energization thereof to close one pair of said normally open contacts and to open said normally closed contacts, a second relay magnet operable upon energization thereof to close the other pair of normally open contacts, and circuit means including a thermostat responsive to the temperature of the enclosure, and circuit means operable under the control of said thermostat for maintaining both of said relay magnets energized when the temperature within the enclosure is below a predetermined maximum, for de-energizing said second relay magnet when the temperature of the enclosure is above said maximum, and for de-energizing the first relay magnet when said temperature attains a higher predetermined maximum.

2. A combination structure defined in claim 1 including a fluid restricting means disposed in said by-pass conduit and in the connection between said pump and said hydraulic pressure motor.

3. A combination structure as defined in claim 2 characterized by the provision of an auxiliary heater for said thermostat and in that an energizing circuit for the auxiliary heater is connected through an energized closed contact of the first mentioned relay.

4. A combination structure as defined in claim 3 characterized in that a resistor is inserted in said auxiliary circuit between the heater and the first relay.

5. A combination structure as defined in claim 4 characterized in that a second circuit for energizing the auxiliary heater is connected through energized closed contacts of both said relays and provides a by-pass around said resistor, whereby an increased volume of heating current is directed to the auxiliary heater.

References Cited in the file of this patent

UNITED STATES PATENTS

| | | |
|---|---|---|
| 2,267,215 | Ray | Dec. 23, 1941 |
| 2,269,411 | Newton | Jan. 6, 1942 |
| 2,574,925 | Lehane | Nov. 13, 1951 |